United States Patent
Moran et al.

(10) Patent No.: US 10,415,477 B2
(45) Date of Patent: Sep. 17, 2019

(54) TURBINE CASING FALSE FLANGE FLOW DIVERTER

(71) Applicant: General Electric Company, Schenectady, NY (US)

(72) Inventors: Brian David Moran, Simpsonville, SC (US); Kyle Eric Benson, Greenville, SC (US); Jeffery Craig Moree, Greer, SC (US); Chandresh R. Shah, Greer, SC (US); Xiaoqiang Zeng, Albany, NY (US)

(73) Assignee: General Electric Company, Schenectady, NY (US)

( * ) Notice: Subject to any disclaimer, the term of this patent is extended or adjusted under 35 U.S.C. 154(b) by 1707 days.

(21) Appl. No.: 13/956,227

(22) Filed: Jul. 31, 2013

(65) Prior Publication Data

US 2015/0033696 A1 Feb. 5, 2015

(51) Int. Cl.

| | |
|---|---|
| F02C 7/18 | (2006.01) |
| B22D 25/02 | (2006.01) |
| F01D 25/14 | (2006.01) |
| F01D 11/24 | (2006.01) |
| F01D 25/12 | (2006.01) |
| F01D 25/26 | (2006.01) |

(52) U.S. Cl.
CPC ............... *F02C 7/18* (2013.01); *B22D 25/02* (2013.01); *F01D 11/24* (2013.01); *F01D 25/12* (2013.01); *F01D 25/14* (2013.01); *F01D 25/26* (2013.01); *F05D 2250/13* (2013.01); *F05D 2250/21* (2013.01); *F05D 2250/232* (2013.01); *F05D 2260/201* (2013.01); *Y02T 50/671* (2013.01); *Y02T 50/676* (2013.01)

(58) Field of Classification Search
CPC .......... F01D 25/08; F01D 25/12; F01D 25/14; F01D 25/16
See application file for complete search history.

(56) References Cited

U.S. PATENT DOCUMENTS

| | | | |
|---|---|---|---|
| 4,302,941 | A * | 12/1981 | DuBell ............... F23R 3/002 60/757 |
| 5,605,438 | A | 2/1997 | Burdgick et al. |
| 6,352,404 | B1 | 3/2002 | Czachor |
| 6,691,019 | B2 | 2/2004 | Seeley et al. |
| 8,021,109 | B2 | 9/2011 | Kneeland et al. |
| 8,047,763 | B2 | 11/2011 | Black |

(Continued)

FOREIGN PATENT DOCUMENTS

EP 2182175 5/2010

*Primary Examiner* — Carlos A Rivera
*Assistant Examiner* — Cameron A Corday
(74) *Attorney, Agent, or Firm* — Fletcher Yoder, P.C.

(57) ABSTRACT

A system includes a turbine casing assembly that includes an outer shell and an inner shell positioned substantially concentrically within the outer shell. The inner shell includes an inner surface facing away from the outer shell and an outer surface facing toward the outer shell, and the outer surface has one or more false flanges. At least one of the one or more false flanges includes a first surface protruding from the outer surface and facing the outer shell, and a flow diverting portion extending between the first surface and the outer surface of the inner shell. The flow diverting portion includes a first portion that diverges in a first circumferential direction between the first surface and the outer surface.

20 Claims, 7 Drawing Sheets

(56) References Cited

U.S. PATENT DOCUMENTS

| | | |
|---|---|---|
| 8,128,353 B2 | 3/2012 | Flanagan et al. |
| 2013/0047618 A1* | 2/2013 | Gregory ............... F23R 3/002 60/722 |

* cited by examiner

TURBINE CASING FALSE FLANGE FLOW DIVERTER

BACKGROUND

The subject matter disclosed herein relates to gas turbines, and more particularly to cooling a turbine casing.

Gas turbines generally combust a fuel/oxidant mixture to generate hot combustion gases, which pass through one or more turbine stages of a turbine section. The hot combustion gases drive turbine blades to rotate within a surrounding casing assembly, thereby driving rotation of a turbine shaft. The casing assembly may include inner and outer shells, shrouds, joints, or other structures. In general, the hot combustion gases cause thermal expansion of structures in the turbine section, such as the shells, shrouds, or joints. This thermal expansion can complicate the design of gas turbines, because thermal expansion can cause changes in the clearance between the blades and the casing assembly. Accordingly, improvements to the design of gas turbines may be helpful to control the clearance during thermal expansion, and to minimize any variations in the roundness of gas turbine components, such as the casing assembly.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine casing assembly that includes an outer shell and an inner shell positioned substantially concentrically within the outer shell. The inner shell includes an inner surface facing away from the outer shell and an outer surface facing toward the outer shell, and the outer surface has one or more false flanges. At least one of the one or more false flanges includes a first surface protruding from the outer surface and facing the outer shell, and a flow diverting portion extending between the first surface and the outer surface of the inner shell. The flow diverting portion includes a first portion that diverges in a first circumferential direction between the first surface and the outer surface.

In a second embodiment, a system includes a turbine casing assembly that includes an outer shell having a coolant port and an inner shell. The inner shell includes an inner surface facing away from the outer shell, an outer surface facing toward the outer shell, and a false flange. The false flange includes a coolant impingement surface having a tapered geometry, and the tapered geometry is configured to divert a flow of coolant from the coolant port in a direction generally away from the false flange and along the outer surface.

In a third embodiment, a method of manufacture includes casting an inner shell of a turbine casing having a shell surface facing and one or more false flanges. At least one of the one or more false flanges includes a first surface protruding from the shell surface. A flow diverting portion of the one or more false flanges extends between the first surface and the shell surface. The flow diverting portion includes a first portion that diverges in a first circumferential direction between the first surface and the shell surface, a second portion that diverges in a second circumferential direction between the first surface and the shell surface, and a third portion that extends between the first and second portions. The third portion diverges in a crosswise direction relative to the first circumferential direction, the second circumferential direction, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper," "lower," "left," "right," "front," "rear," "top," "bottom," "horizontal," "vertical," "upstream," "downstream," "fore," "aft," and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, it may be desirable to reduce or eliminate the presence of thermal gradients that may cause "out of roundness" of a casing for a rotary machine such as a turbine. Elimination of these thermal gradients may promote a longer lifetime for the equipment with increased operating efficiency due to the maintenance of uniform clearance therein. Indeed, the disclosed embodiments include systems and methods relating to a turbine casing assembly that includes an outer shell and an inner shell. The inner shell may be positioned substantially concentrically within the outer shell, and the inner shell includes an inner surface facing away from the outer shell and an outer surface facing toward the outer shell and having one or more false flanges. At least one of the one or more false flanges includes a first surface protruding from the outer surface and facing the outer shell. In accordance with present embodiments, one or more of the false flanges may include a flow diverting portion extending between the first surface and the outer surface of the inner shell. The flow diverting portion may, in certain embodiments, enhance dispersement of a cooling medium (e.g., cooling air, cooling exhaust gas) within an annulus defined by the space between the inner and outer casings. Enhancing the dispersement of the cooling medium within the annulus may increase the ability of the cooling medium to evenly cool the inner and/or outer casings. One technical advantage resulting from this may be a reduction in the out-of-roundness of the inner and/or outer turbine shells.

In certain embodiments, the false flanges having the flow diverting portions disclosed herein may include a first portion that diverges in a first circumferential direction between the first surface and the outer surface. The flow diverting portion may include a second portion that diverges in a second circumferential direction between the first surface and the outer surface, and the first and second circumferential directions may be different so that the at least one of the one or more false flanges is a tapered protrusion.

Figure 1:
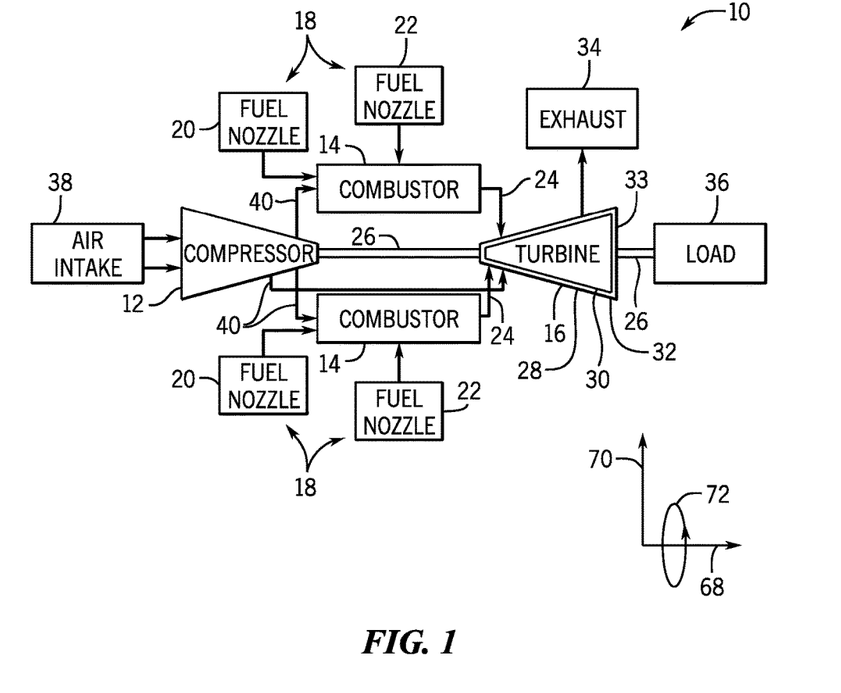
FIG. 1 is a schematic block diagram of an embodiment of a gas turbine system.

The present approaches may be better understood with reference to the figures, which depict various embodiments relating to false flanges configured to divert flow to enhance cooling. Generally, the false flanges may be used in a number of rotating machines where a hot gas is contained by one or more casings. In the present context, the false flanges disclosed herein may be incorporated into steam and/or gas turbines. Turning now to the drawings, FIG. 1 illustrates a block diagram of an embodiment of a gas turbine system 10 incorporating the false flanges disclosed herein. The system 10, as illustrated, includes a compressor 12, turbine combustors 14, and a turbine 16. The turbine combustors 14 include fuel nozzles 18 which route a liquid fuel and/or gas fuel, such as natural gas or syngas, into the turbine combustors 14. As shown, each turbine combustor 14 may have multiple fuel nozzles 18. More specifically, the turbine combustors 14 may each include a primary fuel injection system having primary fuel nozzles 20 and a secondary fuel injection system having secondary fuel nozzles 22.

The turbine combustors 14 ignite and combust an oxidant-fuel mixture (e.g., an air-fuel mixture) to create hot pressurized combustion gases 24 (e.g., exhaust), which are subsequently directed into the turbine 16. In the turbine 16, turbine blades are coupled to a shaft 26 (e.g., via a central wheel), which is also coupled to several other components throughout the turbine system 10. As the combustion gases 24 pass through the turbine blades in the turbine 16, the turbine 16 is driven into rotation, which causes the shaft 26 to rotate. In certain embodiments, a casing 28 of the turbine 16 has an inner shell 30 and an outer shell 32, which may protect the turbine 16 from thermal stress and contain the hot combustion gases 24 as they pass through the turbine 16. As described in more detail in FIGS. 2-9, the casing 28 may be equipped with one or more false flanges, which may contribute to more even heat transfer coefficients across the casing 28. In particular, the false flanges may be used to direct the flow of a cooling medium (e.g., cooling air) within an annulus 33 defined by the space between the inner and outer shells 30, 32.

Eventually, the combustion gases 24 exit the turbine system 10 via an exhaust outlet 34, which may lead to a number of other components such as a heat recovery steam generator (HRSG), various catalyst systems for reducing the concentration of undesirable combustion by-products, and/or other downstream uses. Further, the shaft 26 may be coupled to a load 36, which is powered via rotation of the shaft 26. For example, the load 36 may be any suitable device that may generate power via the rotational output of the turbine system 10, such as a power generation plant, an external mechanical load, or any combination thereof. For instance, the load 36 may include an electrical generator, a propeller of an airplane, and so forth.

In an embodiment of the gas turbine system 10, compressor blades are included as components of the compressor 12. The blades within the compressor 12 are coupled to the shaft 26, and will rotate as the shaft 26 is driven to rotate by the turbine 16, as described above. The rotation of the blades within the compressor 12 causes compression of air from an air intake 38, thereby creating pressurized air 40. The pressurized air 40 is then fed into the fuel nozzles 18 of the combustors 14. The fuel nozzles 18 mix the pressurized air 40 and fuel to produce a suitable mixture ratio for combustion (e.g., a combustion that causes the fuel to more completely burn) so as not to waste fuel or cause excess emissions. In certain embodiments, as illustrated, the pressurized air 40 may be provided to the annulus 33 of the turbine 16 to serve as a cooling medium. Embodiments where the compressor 12 is an exhaust gas compressor that provides compressed exhaust gas to the annulus 33 as a cooling medium are also presently contemplated.

Figure 2:
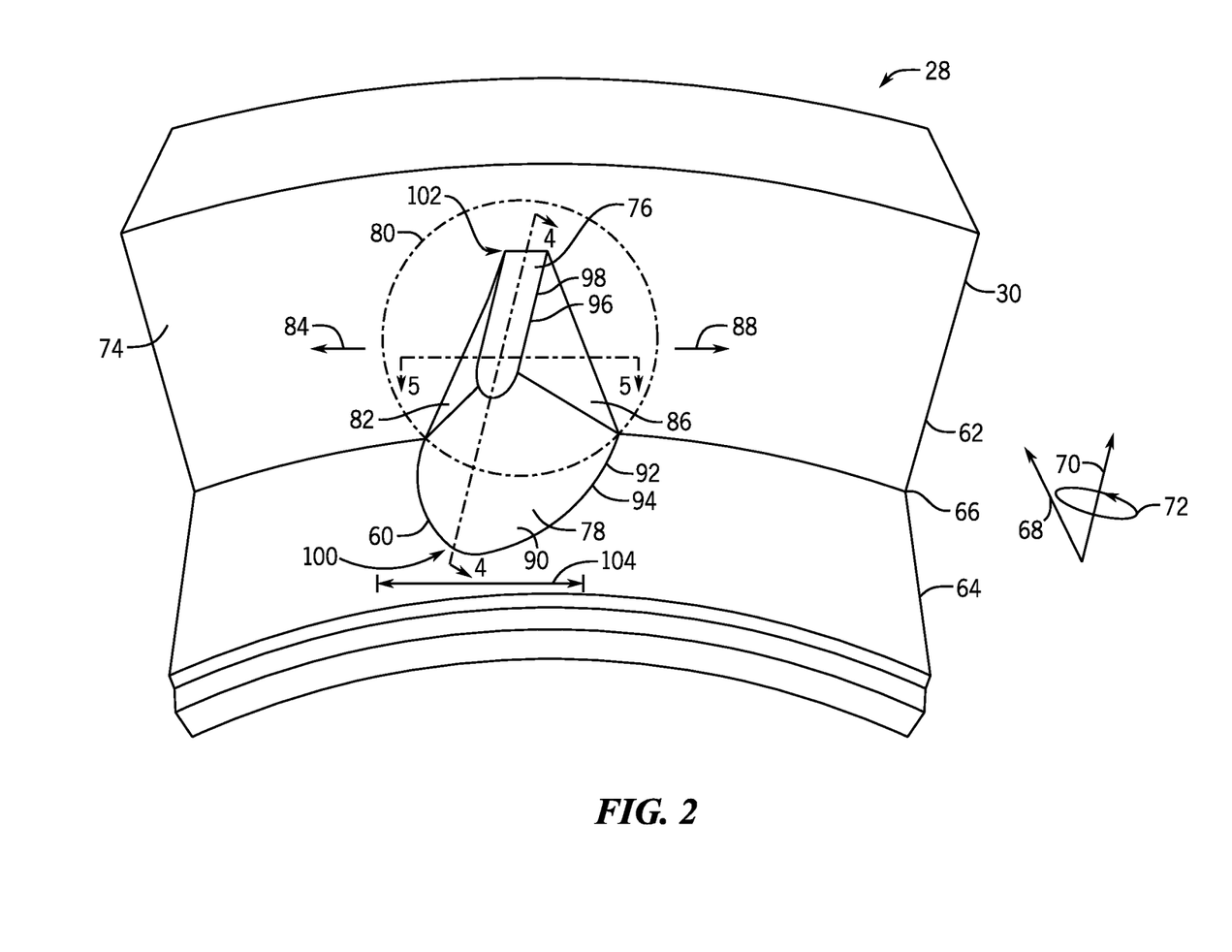
FIG. 2 is a perspective view of an embodiment of a false flange positioned on the inner shell of the casing of the turbine of FIG. 1.

FIG. 2 is a perspective schematic of a portion of an embodiment of the inner turbine shell 30 having a false flange 60. It is understood that the casing 28, including the inner turbine shell 30 and the outer turbine shell 32, may generally extend circumferentially around the entire turbine 16, with the outer turbine shell 32 generally circumferentially surrounding the inner turbine shell 30. The inner turbine shell 30 may be formed by meeting, joining, coupling, or otherwise connecting or placing into abutment two or more inner turbine shell portions, such as first and second halves of the inner turbine shell, using one or more true flanges in combination with, by way of example, one or more bolts.

While the false flanges 60 may be positioned on any surface of the inner turbine shell 30, in the illustrated embodiment the one or more false flanges 60 may be positioned proximate a first section 62 and a second section 64 (e.g., proud, or protruding, and recessed sections, respectively). Respective ends of the first section 62 and the second section 64 meet and are connected at a joint 66, which may be a continuous structure in embodiments where the first and second sections 62, 64 are cast together as all or part of the inner turbine shell 30. The first and second sections 62, 64 of the inner shell 30 may include one or more false flanges 60 configured to reduce out of roundness caused by uneven thermal stress on the casing 28. Any one or a combination of the false flanges 60 may be configured to divert cooling medium flow in a desired manner.

As shown in the illustrated embodiment, the false flange 60 may be positioned along an axial axis or direction 68, a radial axis or direction 70, and a circumferential axis or direction 72, where the axial direction 68 generally defines the direction extending from the compressor 12 to the turbine 16 of the gas turbine system 10. As discussed herein, out of roundness may correlate to differences in expansion of the casing (e.g., inner and/or outer shells 30, 32) in the radial direction 70 along various points of the inner and/or outer shells 30, 32 in the circumferential direction 72, which can be caused by differences in thermal gradients. In accordance with present embodiments, the false flanges 60 may be configured to cause a flow of a cooling medium to be directed to desired portions of the inner and/or outer shells 30, 32 so as to mitigate the effect of thermal gradients on the thermal expansion thereof. In other words, the false flanges 60 may be configured to divert the flow of a cooling medium along the surface of the inner turbine shell 30 in a manner that enhances the uniformity of the thermal expansion of the inner turbine shell 30.

The false flange 60 may take the form of a raised piece that extends radially 70 away from an outer surface 74 of the inner shell 30 of the casing 28 (e.g., protrudes into the annulus 33 of FIG. 1). The false flange 60 may have a first surface 76 protruding from the outer surface 74 and facing the outer shell 32, and a flow diverting portion 78 (e.g., a coolant impingement surface, spreader surface, etc.) that extends between the first surface 76 and the outer surface 74 of the inner shell 30. The flow diverting portion 78 may have any suitable geometry configured to divert a flow of a coolant flowing in from a coolant port 80, located on the outer shell 32 of the casing 28, in a direction generally away from the false flange 60 and along the outer surface 74. The relative positioning and configuration of the coolant port 80 as it relates to the false flange 60 is discussed in further detail below.

The tapered geometry of the flow diverting portion 78 may be formed from a first portion 82, which diverges in a first circumferential direction 84 between the first surface 76 and the outer surface 74, and a second portion 86, which diverges in a second circumferential direction 88. As shown, the first and second circumferential directions 84 and 88 may be different, such that the false flange 60 is a tapered protrusion on the outer surface 74 of the inner shell 30. The flow diverting portion 78 may also have a third portion 90 that extends between the first portion 82 and the second portion 86, and it diverges in a crosswise direction relative to the first circumferential direction and/or the second circumferential direction. The third portion 90 may have an arcuate (e.g., bow-shaped, curved, etc.) structure, which may allow the third portion 90 to direct a coolant across the outer surface 74 not only along the circumferential direction 72, but also in the axial direction 68. The first, second, and third portions 82, 86, and 90 of the false flange 60 may form a continuous surface (e.g., free of edges, seams, etc.), or may be clearly delineated via such seams or edges. Indeed, it may be desirable for the false flange 60 to be substantially free of edges and/or seams to reduce localized areas of high heat transfer coefficients. In other words, the continuous surface of the false flange 60 may further enhance the reduction of heat transfer coefficient gradients along the inner turbine shell 30.

The interface of the first, second, and third portions of the false flange 60 and the outer surface 74 of the inner shell 30 may form a base 92 of the false flange 60. The base 92 may have a first cross-sectional area 94 that is greater than a second cross-sectional area 96 of the false flange 60 taken at or near a top 98 of the flange 60. The ratio of the first cross-sectional area 94 to the second cross-sectional 96 area may be between approximately 1.05:1 and 10:1, 1.05:1 and 5:1, 1.05:1 and 2.5:1, or any ratio therein. The false flange 60 may be solid or hollow. Furthermore, the false flange 60 may be cast in (e.g., integral, or formed with) the outer surface 74 of the inner shell 30, or it may be attached (e.g., bolted, adhered, welded, etc.) to the outer surface 74. As shown and described above, the false flange 60 may taper axially 68, radially 70, and circumferentially 72. In certain embodiments, a first end 100 of the false flange 60 (e.g., at a first axial extent) extends radially 70 farther from the outer surface 74 of the inner shell 30 than a second end 102 (e.g., at a second axial extent). In addition, as noted above, the first cross-sectional area 94 (e.g., near the base 90 of the flange 60) may be greater than the second cross-sectional area 96 (e.g., near the top), and a width 104 of the base 90 may generally taper from the first end 100 to the second end 102.

Figure 10:
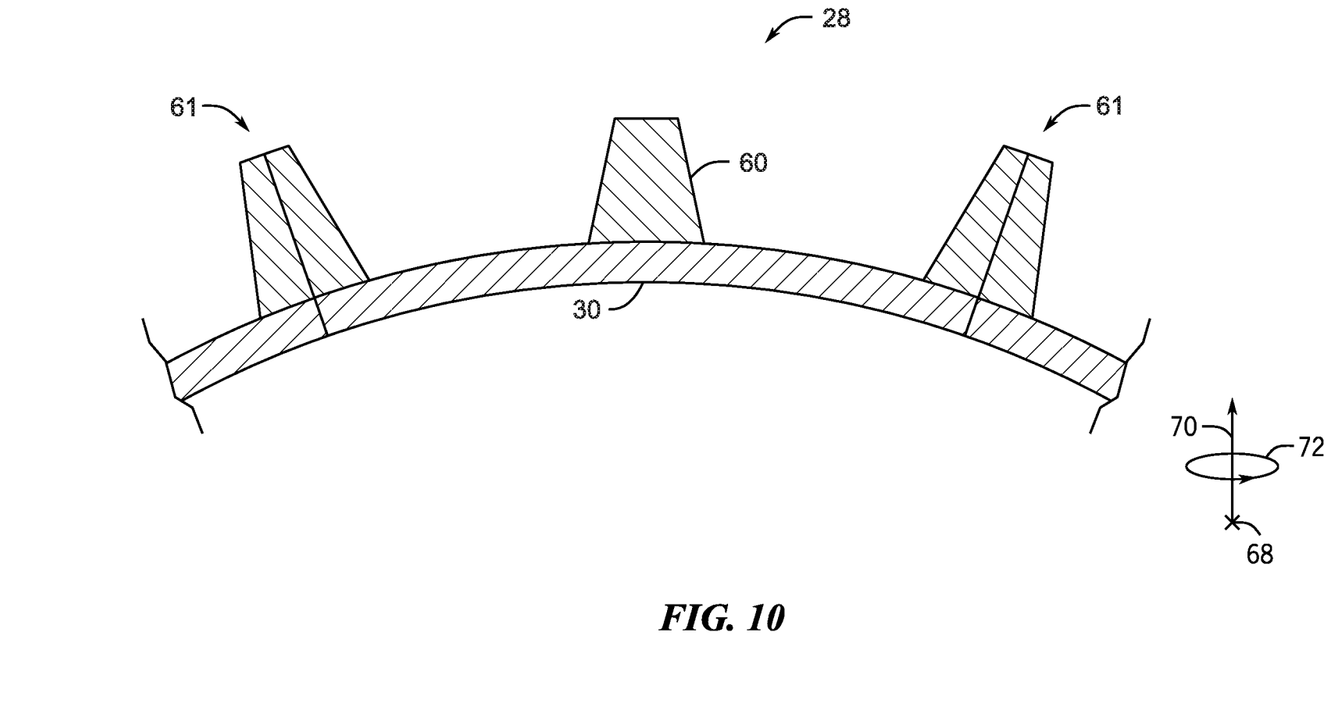
FIG. 10 is a front view of an embodiment of a false flange circumferentially spaced relative to functional flanges.

The false flange 60 may be constructed from a material having similar or the same properties (e.g., hardness, thermal coefficient of expansion, thermal conductivity, heat capacity) compared to the inner shell 30, and may have a mass that is substantially similar to the mass of true or functional flanges 61 that may be included on the turbine casing 28 (see FIG. 10). Having a similar mass and material to a functional flange on the turbine casing 28 may allow the false flange 60 to better mimic the thermal effects caused by the flange, which may enable the false flange 60 to counter the thermal effects of the flange on the casing 28, thereby reducing out-of-roundness in the casing 28. As noted above, the false flange 60 may be bolted, adhered, or otherwise coupled to existing casings 28, or the false flange 60 may be cast in to the casings 28 (e.g., the false flange 60 and the casing 28 may be formed or molded as one piece). In embodiments where the false flange 60 is cast in, the false flange 60 and the casings 28 may be made of the same or different materials.

Therefore, in certain embodiments, a method of manufacturing a turbine casing assembly including the inner shell 30 may include, by way of non-limiting example, casting the inner shell 30 to include one or more of the false flanges 60 in addition to other desired features. Casting the inner shell 30 may include separately casting various sections of the inner shell 30 (e.g., halves, quarters, eighths), where at least one of the sections includes at least one false flange. The sections will generally (upon assembly) be placed in abutment or otherwise coupled to one another using true flanges, which may also be cast in or otherwise secured to the inner shell sections, in order to form the complete inner shell 30.

In other embodiments, a method of manufacturing a turbine casing assembly including the inner shell 30 may include, by way of non-limiting example, casting the inner shell 30 without the one or more of the false flanges 60. As above, casting the inner shell 30 may include separately casting various sections of the inner shell 30 (e.g., halves, quarters, eighths), which will generally (upon assembly) be placed in abutment or otherwise coupled to one another using true flanges. In such embodiments, the method may further include securing one or more false flanges to at least one of the sections (e.g., halves, quarters, eighths) of the inner shell 30, either before all sections are assembled, or after.

In either of the general methods presented above, the one or more false flanges 60 may be positioned on the inner shell 30 so as to receive a flow of coolant from the outer shell 32. For instance, the outer shell 32 of the turbine 16 may have one or more of the coolant ports 80, which may be configured to direct a coolant toward the inner shell 30 of the turbine 16. More specifically, the coolant ports 80 may direct a coolant onto the false flanges 60. In the illustrated embodiment, the coolant port 80 is depicted as a dashed line to show that the coolant port 80 may be located at any point along the axial direction 68 of the annulus 33. For example, the coolant port 80 may be located axially upstream or downstream from the false flange 60, or may overlap in the axial direction 68 with the false flange 60. In certain embodiments, a cooling medium may flow out of the outer turbine shell 32 and "down" (e.g., in a crosswise direction, such as the radial direction 70, from the outer turbine shell 32 to the inner turbine shell 30) onto the false flange 60. Due to the tapered geometry of the false flange 60, the cooling medium flow may be diverted along the circumferential direction 72 to enhance the uniformity of the measured heat transfer coefficient in an area proximate the false flange 60, thereby reducing thermal gradients and effecting a more uniform thermal expansion of the inner turbine shell 30. Again, this may have the advantage of reducing out-of-roundness (or increasing out-of-roundness) of the inner and/or outer shells 30, 32 during operation.

In some embodiments, the first surface 76 of the false flange 60 and the coolant port 80 may at least partially overlap in a radial direction 70, as shown, such that during operation, the false flange 60 may divert the flow of coolant from the coolant port 80 360° outward from the base 92, along the outer surface 74 of the inner shell 30. In other embodiments, the flow diverting portion 78 of the false flange 60 and the coolant port 80 may at least partially overlap, so that the coolant may impact the flow diverting portion 78 and be spread across the outer surface 74 of the inner shell 30. In this way, the false flange 60 may divert (e.g., spread, disperse, diffuse, etc.) the coolant from the coolant port 80 across the outer surface 74 of the inner shell 30 to allow more even heat cooling of the turbine casing 28. Further, each coolant port 80 may have one or more respective false flanges 60 that receive a direct impingement of cooling medium flow therefrom.

One manner by which the overlap between the coolant port 80 and its respective false flange(s) 60 may be measured is to determine how much of the total surface area of each of the false flange 60 and the coolant port 80 overlap with one another along the circumferential and axial directions 72, 68. For example, the false flange 60 and the coolant port 80 may overlap with one another such that all or a portion of the first, second, and/or third sections 82, 86, 90, the first surface 76, or any combination thereof, of the false flange 60 may overlap with the coolant port 80 along the circumferential and radial directions 72, 70. That is, all or a portion of the first section 82 may overlap with the coolant port 80, all or a portion of the second section 86 may overlap with the coolant port 80, all or a portion of the third section 90 may overlap with the coolant port 80, or all or a portion of the first surface 76 may overlap with the coolant port 80.

The turbine casing 28 may have an equal number of false flanges 60 as cooling ports 80, or it may have a larger or smaller number of false flanges 60 depending on the needs and specification of the individual gas turbine system 10. For example, certain embodiments may have between 1 and 50, 1 and 25, or 1 and 10 false flanges. As such, in some embodiments, the false flange 60 may be cast, formed, or otherwise manufactured as one piece with the outer surface 74 of the inner shell 30. In other embodiments, the false flange 60 may be formed separately and then attached to the outer surface. In some situations, the false flange 60 may be added to an existing gas turbine casing to improve heat transfer across the surface to reduce out of roundness of the casing.

Figure 3:
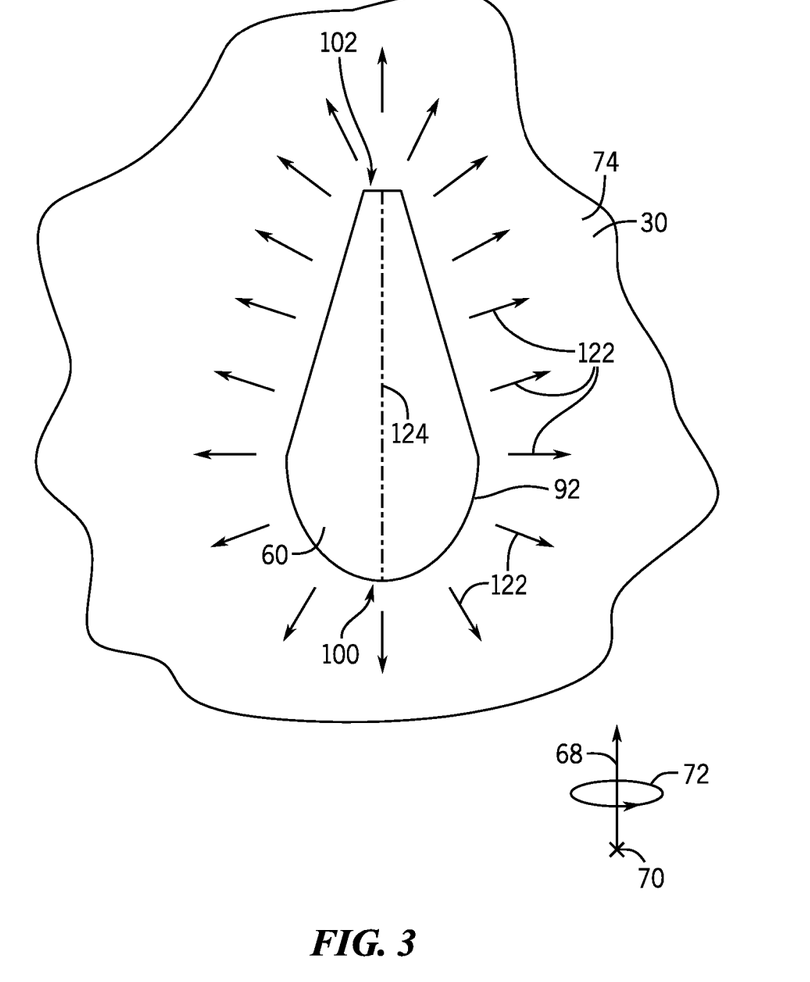
FIG. 3 is a top view of an embodiment of the false flange of FIG. 2.

FIG. 3 is a top view of the false flange 60 of FIG. 2, showing possible air flow paths 122 that may result from the flow diversion of the coolant by the false flange 60. As the arrows indicate, the false flange 60 may direct the coolant in any direction away from the false flange 60. In certain embodiments, the false flange 60 may be configured to direct the coolant to a particular location or locations. For example, the false flange 60 may be tapered or slanted to favor air distribution in a particular direction or to a particular location, such as a known hot spot on the outer surface 74 of the inner shell 30. Alternately, the false flange 60 may spread air generally evenly in the circumferential direction 72, the radial direction 70, the axial direction 68, or any combination thereof, across the outer surface 74.

The top view of FIG. 3 also depicts the general shape of the base 92. The base 92 may have any suitable shape, including shapes that are symmetrical or asymmetrical about a longitudinal axis 124 of the false flange 60, and shapes that are symmetrical or asymmetrical about an axis that is crosswise relative to the longitudinal axis 124 of the false flange 60. For example, the base 92 may have an airfoil shaped geometry, a gradually converging geometry, or a tear drop shaped geometry. Indeed, the base 92 may have any regular or irregular shape including any number of geometric features, such as notches, protrusions, channels, and so forth.

Figure 4:
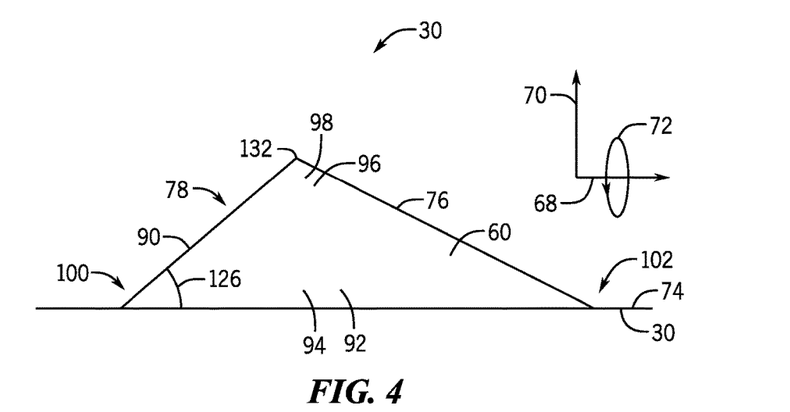
FIGS. 4 and 5 are a cross-sectional side views of an embodiment of the false flange of FIG. 2.

FIG. 4 is a cross-sectional side view of an embodiment of the false flange 60, taken through line 4-4 in FIG. 2. As depicted, the third section 90 of the flow diverting portion 78 has an angle of incline 126 with respect to the outer surface 74 of the inner shell 30 (measured from within the false flange 60). The angle of incline 126 may determine to what degree impinging coolant flow is directed away from the false flange 60 along both the axial and circumferential directions 68, 72. For example, a steep level of incline (e.g., the angle of incline 126 is greater than 45 degrees) may cause the coolant to be distributed less axially 68, while a shallower angle of incline may enable more flow in the axial direction 68. Generally, the angle of incline 126 may be between approximately 0 and 180 degrees, such as an acute angle of between approximately 1 degree and 90 degrees, approximately 10 degrees and 80 degrees, approximately 20 degrees and 70 degrees, or approximately 30 degrees and 50 degrees. In other embodiments, the angle of incline 126 may be an obtuse angle of between approximately 90 degrees and 180 degrees, approximately 100 degrees and 170 degrees, approximately 110 degrees and 160 degrees, or approximately 120 degrees and 140 degrees. It should be noted that the angle of incline 126 of the third portion 90, when an obtuse angle, may cause a greater amount of flow to be distributed in the axial direction 68 toward the fore end of the gas turbine system 10, while when it is an acute angle, may cause a greater amount of flow to be distributed in the axial direction 68 toward the aft end of the gas turbine system 10.

The first and second portions 82 and 86 of the false flange 60 may also have respective angles of incline, as discussed in further detail below with respect to FIG. 5. In this way, the false flange 60 may improve the cooling of the casing 28 by distributing the coolant across the inner shell 30, thereby reducing inhomogeneities in the heat transfer coefficients.

As illustrated in FIG. 4, the false flange 60 may have a generally triangular cross-section when the cross-section is taken along line 4-4. As described above, the false flange 60 may reduce out of roundness in the turbine casing 28 by increasing the effectiveness of coolant distribution across the outer surface 74 of the inner shell 30. Again, the false flange 60 may protrude from the outer surface 74 of the inner shell 30 with a generally triangular shape (e.g., the top 98 is narrower than the base 92) that may allow impinging coolant flow to diverge axially. Such a cross-sectional geometry may result in the false flange 60 having a conical, slanted conical, pyramidal, slanted pyramidal, or similar three-dimensional geometry, depending also on the cross-sectional geometry of the second and third sections 82, 86.

As noted above, the false flange 60 may also have a mass that allows it to offset the thermal irregularities caused by true flanges on the casing 28. In other words, the false flanges 60 may have similar masses to the true flanges on the casing 28, such that the differences in heating and cooling of the casing 28 caused by the true flanges are mirrored by the false flanges 60, and are more evenly distributed circumferentially about the inner shell 30. The false flange 60 may also be contoured to spread impinging coolant flow in a variety of directions on the outer surface 74. To spread coolant in the axial 68 direction, the false flange 60 may include various contours that each diverge axially 68, radially 70, and/or circumferentially 72. The third portion 90 of the flow diverting portion 78 and the first surface 76 of the false flange 60 may meet at an edge or corner 132, which, in certain embodiments, may be chamfered, rounded, removed, or otherwise contoured to improve heat distribution across the casing 28, for example to alter the path of the coolant across the outer surface 74 of the inner shell 30. Indeed, in some embodiments, the edge or corner 132 may be rounded to avoid a localized heat transfer coefficient that is different than the heat transfer coefficient of the surrounding area of the false flange 60 and inner shell 30.

Figure 5:
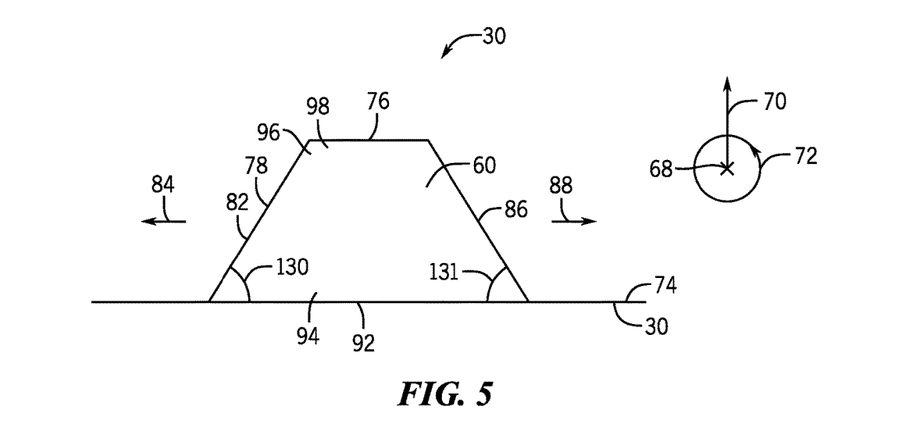

FIG. 5 is a cross-sectional front view of an embodiment of the false flange 60, taken through line 5-5 in FIG. 2. The false flange 60 may have slanting first and second portions 82 and 86 of the flow diverting portion 78, with the third portion 90 (FIG. 2) extending between them. As shown, the first cross-sectional area 94 (e.g., of the base 92) of the false flange 60 may be larger than the second cross-sectional area 96 (e.g., of the top 98) of the false flange 60. This difference in cross-sectional areas may contribute to the coolant-spreading capabilities of the false flange 60. The magnitude of the difference between the two cross-sectional areas 94 and 96 may help determine the extent of the coolant spreading by the false flange 60, as discussed above.

As set forth above with respect to the third portion 90, the first and second portions 82, 86 of the flow diverting portion 78 of the false flange 60 have respective angles of incline 130, 131. The angles of incline 130, 131 (measured from within the false flange 60) may, independent of one another, be any suitable angle, including embodiments where one of the angles of incline 130, 131 is obtuse while the other is acute, embodiments where both angles of incline 130, 131 are acute, and embodiments where both angles of incline are obtuse. Accordingly, the angles of incline 130, 131 may independently be any suitable angle between approximately 0 degrees and 180 degrees relative to the surface 74 of the inner shell 30. For example, the angles of incline 130, 131 may be, independent of one another, between approximately 0 and 180 degrees, such as an acute angle of between approximately 1 degree and 90 degrees, approximately 10 degrees and 80 degrees, approximately 20 degrees and 70 degrees, or approximately 30 degrees and 50 degrees. In other embodiments, the angles of incline 130, 131 may be, independent of one another, an obtuse angle of between approximately 90 degrees and 180 degrees, approximately 100 degrees and 170 degrees, approximately 110 degrees and 160 degrees, or approximately 120 degrees and 140 degrees.

It should be noted that embodiments including the angle of incline 130 of the first portion 82 as an obtuse angle, may have a greater amount of flow of the cooling medium in the second circumferential direction 88. Alternately, when the angle of incline 130 of the first portion 82 is an acute angle (as in the illustrated embodiment), the first portion 82 may cause a greater amount of flow to be distributed generally in the first circumferential direction 84. Similarly, but having the opposite effect, in embodiments where the angle of incline 131 of the second portion 86 is an obtuse angle, the second portion 86 may cause a greater amount of flow of the cooling medium to be distributed generally in the first circumferential direction 84, while when it is an acute angle (as in the illustrated embodiment), the second portion 86 may cause a greater amount of flow to be distributed generally in the second circumferential direction 88. Therefore, the first and second portions 82, 86, as discussed above, are capable of directing flow to a particular area depending on their respective angles of incline 130, 131, in addition to any other contoured, textured, channeled, or other surface features.

Figure 6:
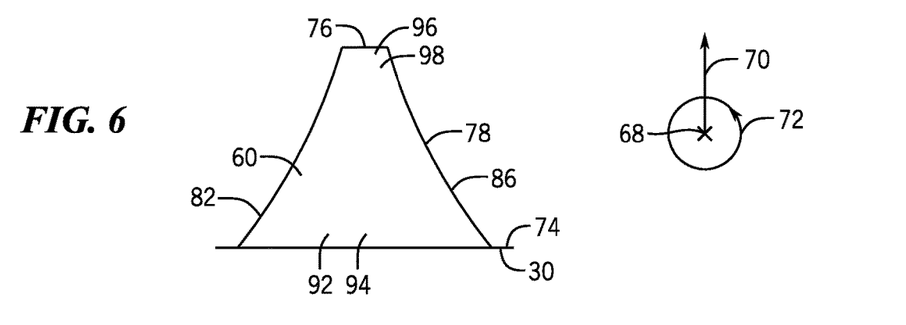
FIG. 6 is a side view of an embodiment of the false flange of FIG. 2.
Figure 7:
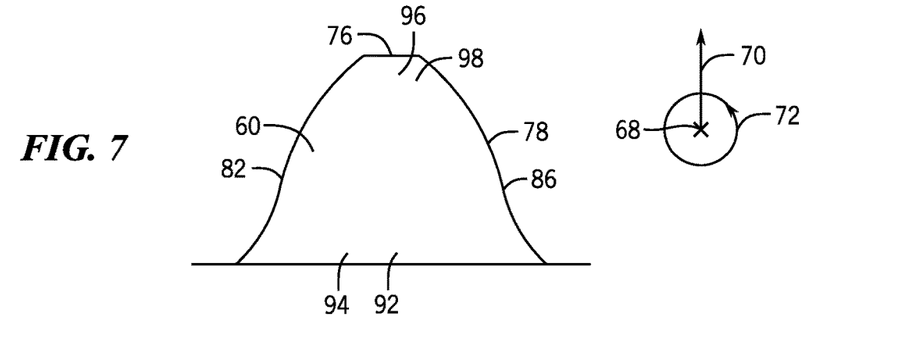
FIG. 7 is a side view of an embodiment of the false flange of FIG. 2.
Figure 8:
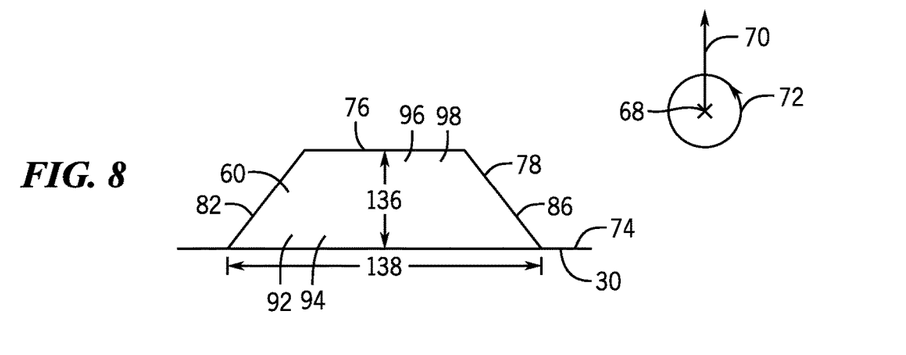
FIG. 8 is a side view of an embodiment of the false flange of FIG. 2.

Indeed, the first and second portions 82 and 86 may have any number of contours, as shown in FIGS. 6-8. In particular, FIGS. 6-8 show various embodiments of the cross-sectional shape of the false flange 60, as taken through line 5-5. The cross-sectional shape, as illustrated, may depend on the contours of the first and second portions 82, 86, as well as the shape and contour of the first surface 76.

In FIG. 6, the first and second portions 82 and 86 of the flow diverting portion 78 are concave (e.g., have surfaces that converge toward one another), which may cause impinging cooling medium from the outer shell 32 to spread more smoothly across the outer surface 74 of the inner shell 30. Further, while the first and second portions 82, 86 are both depicted as being concave in FIG. 6, embodiments in which only the first portion 82 or only the second portion 86 is concave are also presently contemplated. Further, in certain embodiments, only a section of the first and/or second portions 82, 86 may be concave. For example, in some embodiments the first portion may have one or more concave sections that converge toward the second portion 86, while also having one or more other sections that are flat, tapered, convex (e.g., diverging with respect to the second portion 86), channeled, textured, or any combination thereof. The same may be true for the second portion 86, where the second portion may include one or more concave sections that converge toward the first portion 82, while also having one or more other sections that are flat, tapered, convex (e.g., diverging with respect to the first portion 82), channeled, textured, or any combination thereof.

Indeed, in FIG. 7, the first and second portions 82 and 86 are generally both convex near the top 98, and concave near the base 92. Thus, the side portions 82 and 86 may have an "s" shape, a bell shape, a shape resembling a Gaussian function, or any similar shape. This curvature, having both convex and concave portions, may reduce or eliminate corners and edges on the false flange 60, which may contribute to smoother coolant distribution and a reduction of local minima or maxima with respect to measured heat transfer coefficients. More particularly, such curvature may smooth the contours of the false flange 60, such as the corner or edge 132 shown in FIG. 4.

Additionally or alternatively, the first and second portions 82 and 86 may not have concave sections. In such embodiments, the first and second portions 82 and 86 may, independent of one another, be convex (e.g., diverging away from one another), flat, tapered, or any other non-concave shape. Again, embodiments where at least a portion of the false flange 60 is convex may be desirable to enable the false flange 60 to diverge the coolant flow without generating localized heat transfer coefficient maxima or minima.

As set forth above with respect to surface area, the ability of the false flange 60 to smoothly direct coolant flow in the above manner, in accordance with present embodiments, may not be limited to the shape of the false flange 60, but also the sizes of different portions of the false flange 60 (e.g., the relative sizing of the first, second, and third portions 82, 86, 90 of the flow diverting portion 78). The size of the false flange 60 relative to the size of the annulus 33 (FIG. 1) may also be a factor in determining the manner in which the false flange 60 may direct coolant flow. Indeed, in some embodiments, the extent to which the false flange 60 protrudes into the annulus 33 from the outer surface 74 of the inner shell 30 may be controlled to adjust heat transfer coefficients resulting from coolant flow. By way of example, the embodiment of the false flange 60 shown in FIG. 8 has a height 136 (e.g., measured from the outer surface 74 of the inner shell 30 to the highest extent of the first surface 76) that is less than a width 138 (e.g., measured as a width of the base 92) of the false flange 60. However, the height 136 may, in other embodiments, be the same or larger in magnitude than the width 138. Indeed, any relation between the height 136 and the width 138 is presently contemplated, including embodiments where a magnitude of the height 136 is between approximately 10% and 1000% of a magnitude of the width 138, such as embodiments where the magnitude of the height 136 is smaller (e.g., where the height 136 is between approximately 20% and 100%, 30% and 90%, 40% and 80%, 50% and 70% of the width 138) and embodiments where the magnitude of the height 136 is larger (e.g., where the height 136 is between approximately 100% and 1000%, 200% and 900%, 300% and 800%, 400% and 700% of the width 138).

Figure 9:
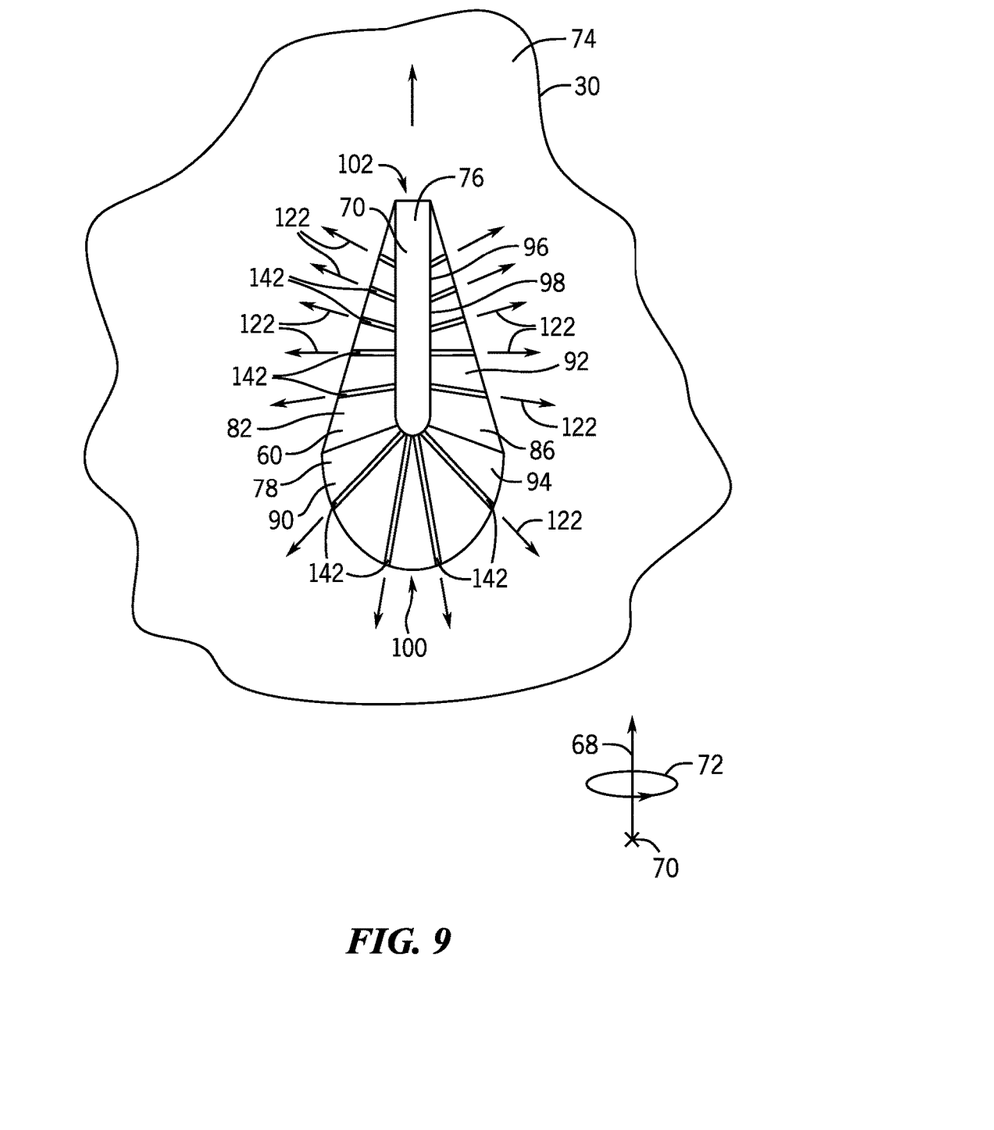
FIG. 9 is a front view of an embodiment of the false flange of FIG. 2, having flow-directing grooves.

As noted above, any of the portions 82, 86, 90 of the flow diverting portion 78 may have, in addition to their major geometry (e.g., a large convex or concave section, a flat section), minor geometrical features that may be able to affect the distribution of coolant flow. For example, any one or a combination of the first, second, or third portions 82, 86, 90 may be textured, channeled, grooved, or otherwise patterned to accomplish a desired flow direction. By way of non-limiting example, FIG. 9 is a top view of an embodiment of the false flange 60 having grooves 142 (e.g., channels, paths, etc.) configured to direct the coolant to more specific locations on the outer surface 74 of the inner shell 30. The grooves 142 may concentrate the coolant flowing over the false flange 60 into specific coolant flow paths or streams 122, which may specifically target known hot spots on the outer surface 74 of the inner shell 30. Indeed, the grooves 142 may further improve coolant distribution across the outer surface 74 by specifically channeling the coolant in a particular direction, toward a particular feature, or the like. The grooves 142 may have sharp edges or, more advantageously, rounded edges to prevent the formation of local heat transfer coefficient maxima/minima. The grooves 142 may be introduced into the false flange 60 using any suitable method, such as during casting, or using any appropriate machining technique after the false flange 60 is formed.

The disclosed embodiments are directed to systems and methods relating to a turbine casing 28 in which an inner shell 30 includes one or more false flanges 60. The one or more false flanges 60 may include a first surface 76 protruding from the inner shell 30 and a flow diverting portion 78 such that the false flange 60 is configured to direct coolant flows in one or more predetermined directions. Technical effects of the disclosed embodiments include improved techniques for preventing out-of-roundness of turbomachine casings, which can improve operational life and efficiency. However, it should be noted that the disclosed embodiments may also be used in other contexts and may be advantageous for solving other technical problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbine casing assembly configured to extend about one or more stages of turbine blades downstream from a combustor, wherein the turbine casing assembly comprises:
an outer shell; and
an inner shell positioned substantially concentrically within the outer shell, wherein the inner shell comprises an inner surface facing away from the outer shell and an outer surface facing toward the outer shell, and the inner shell comprises a plurality of sections circumferentially spaced around the one or more stages of turbine blades;

one or more functional flanges each coupling together adjacent sections of the plurality of sections of the inner shell;

one or more false flanges each coupled to one of the adjacent sections of the plurality of sections of the inner shell, wherein the one or more false flanges are circumferentially spaced relative to the one or more functional flanges, and at least one of the one or more false flanges comprises:

a first surface protruding from the outer surface and facing the outer shell; and a flow diverting portion extending between the first surface and the outer surface of the inner shell, wherein the flow diverting portion comprises a first portion that diverges in a first circumferential direction between the first surface and the outer surface.

2. The system of claim 1, wherein the flow diverting portion comprises a second portion that diverges in a second circumferential direction between the first surface and the outer surface, and the first and second circumferential directions are different such that the at least one of the one or more false flanges is a tapered protrusion.

3. The system of claim 2, wherein the flow diverting portion comprises a third portion that extends between the first and second portions, and the third portion diverges in a crosswise direction relative to the first circumferential direction, the second circumferential direction, or a combination thereof.

4. The system of claim 3, wherein the third portion comprises an arcuate structure.

5. The system of claim 1, wherein each of the one or more false flanges is elongated in a direction extending along the outer surface of the inner shell.

6. The system of claim 5, wherein each of the one or more false flanges has an airfoil shape or tear drop shape elongated in the direction extending along the outer surface of the inner shell.

7. The system of claim 1, wherein the first surface and a coolant port of the outer shell at least partially overlap in a radial direction.

8. The system of claim 1, wherein a coolant port of the outer shell and the flow diverting portion at least partially overlap along an axial direction and a circumferential direction of the inner shell.

9. The system of claim 5, wherein the direction is an axial direction such that an axial length is greater than a circumferential width of each of the one or more false flanges.

10. The system of claim 1, comprising:
a gas turbine engine, comprising:
a turbine section having the turbine blades positioned within the inner shell of the turbine casing assembly, wherein the inner surface of the inner shell faces toward the turbine blades and the outer surface faces away from the turbine blades; and
a compressor configured to intake a fluid and compress the fluid, wherein the gas turbine engine is configured to direct at least a portion of the compressed fluid to a coolant port of the outer shell such that the compressed fluid impinges on at least the flow diverting portion of the false flange.

11. The system of claim 1, wherein the at least one of the one or more false flanges is cast into the inner shell.

12. A system, comprising:
a turbine casing assembly configured to extend about one or more stages of turbine blades downstream from a combustor, wherein the turbine casing assembly comprises:
an outer shell comprising a coolant port;
an inner shell comprising an inner surface facing away from the outer shell and an outer surface facing toward the outer shell, wherein the inner shell comprises a plurality of sections circumferentially spaced around the one or more stages of turbine blades;
one or more functional flanges each coupling together adjacent sections of the plurality of sections of the inner shell;
wherein the outer surface of the inner shell comprises a false flange coupled to one of the adjacent sections of the plurality of sections of the inner shell and circumferentially spaced relative to the one or more functional flanges, wherein the false flange comprises a coolant impingement surface having a tapered geometry configured to divert a flow of coolant from the coolant port in a direction generally away from the false flange and along the outer surface, wherein the false flange is elongated in a direction extending along the outer surface of the inner shell.

13. The system of claim 12, wherein the false flange and the coolant port at least partially overlap in a circumferential direction and an axial direction.

14. The system of claim 12, wherein the tapered geometry comprises a first portion that diverges in a first circumferential direction, a second portion that diverges in a second circumferential direction, and a third portion that extends between the first and second portions and diverges in a radial direction.

15. The system of claim 12, wherein the false flange comprises a flat top surface facing the outer shell.

16. The system of claim 12, wherein the false flange has an airfoil shape or tear drop shape elongated in the direction extending along the outer surface of the inner shell.

17. The system of claim 12, wherein the direction is an axial direction such that an axial length is greater than a circumferential width of each of the one or more false flanges.

18. A method of manufacture, comprising:
coupling one or more functional flanges to adjacent sections of a shell of a turbine casing, wherein the adjacent sections are configured to be circumferentially spaced around one or more stages of turbine blades downstream from a combustor;
coupling one or more false flanges to the adjacent sections of the shell of the turbine casing, wherein each of the one or more false flanges is elongated in a direction extending along a shell surface of the shell and the one or more false flanges are circumferentially spaced relative to the one or more functional flanges, wherein at least one of the one or more false flanges comprises:
a first surface protruding from the shell surface; and
a flow diverting portion extending between the first surface and the shell surface, wherein the flow diverting portion comprises a first portion that diverges in a first circumferential direction between the first surface and the shell surface, a second portion that diverges in a second circumferential direction between the first surface and the shell surface, and a third portion that extends between the first and second portions, and the third portion diverges in a crosswise direction relative to the first circumferential direction, the second circumferential direction, or a combination thereof.

19. The method of claim 18, wherein each of the one or more false flanges has an airfoil shape or tear drop shape elongated in the direction extending along the shell surface of the shell.

20. The method of claim 18, wherein the direction is an axial direction such that an axial length is greater than a circumferential width of each of the one or more false flanges.

\* \* \* \* \*